Figure 4:
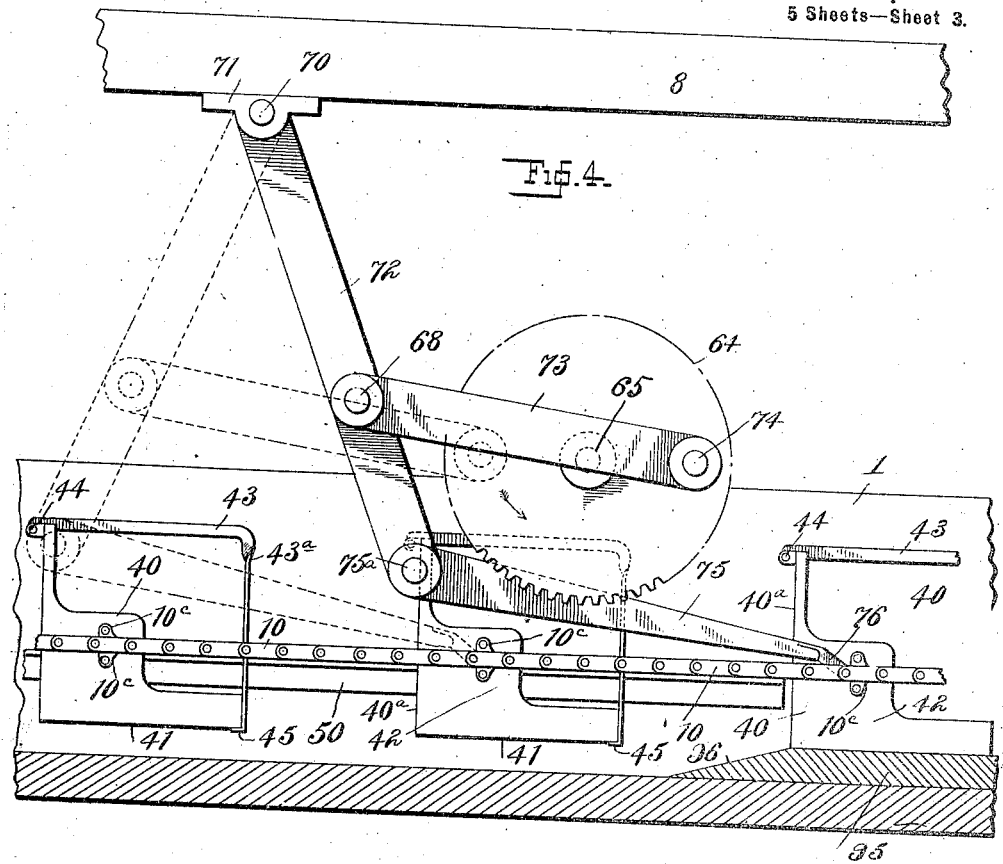

No. 688,740.  
Patented Dec. 10, 1901.
R. H. KISSEL & W. P. PARSONS.
BOTTLE WASHING AND STERILIZING MACHINE.
(Application filed Dec. 28, 1900.)
(No Model.)  
5 Sheets—Sheet 1.
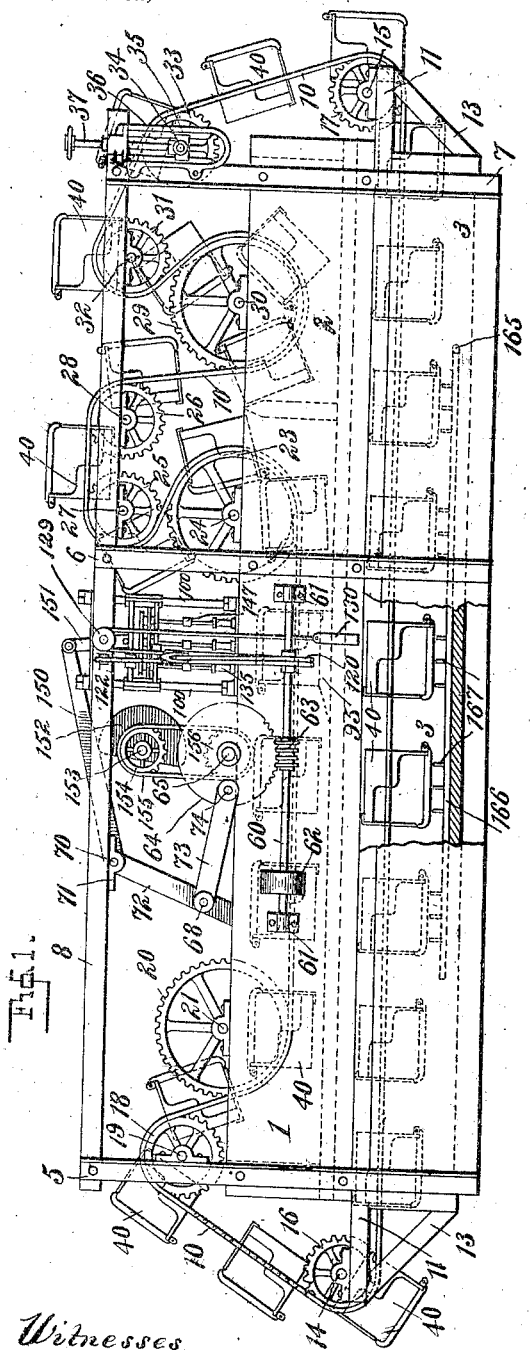
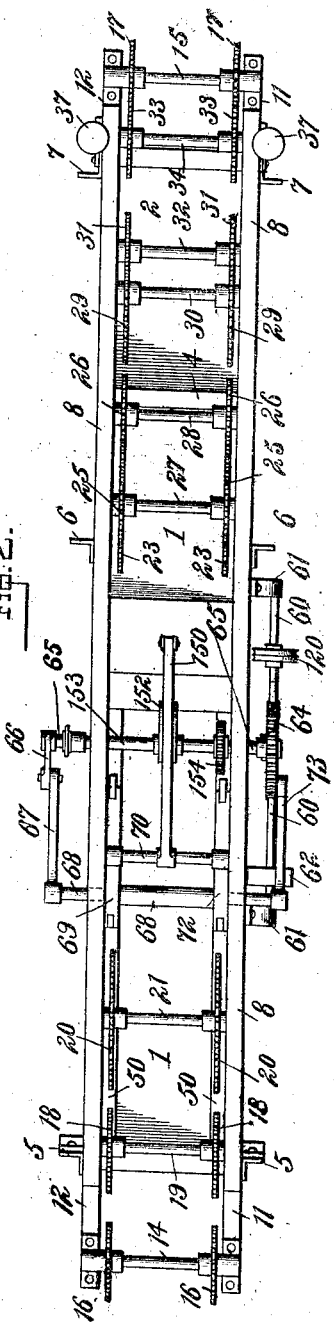
Witnesses  
Wm. A. Courtland  
Wm. P. Hammond
Inventors  
Rudolph H. Kissel  
Millard P. Parsons  
By Knight Bros  
Attys

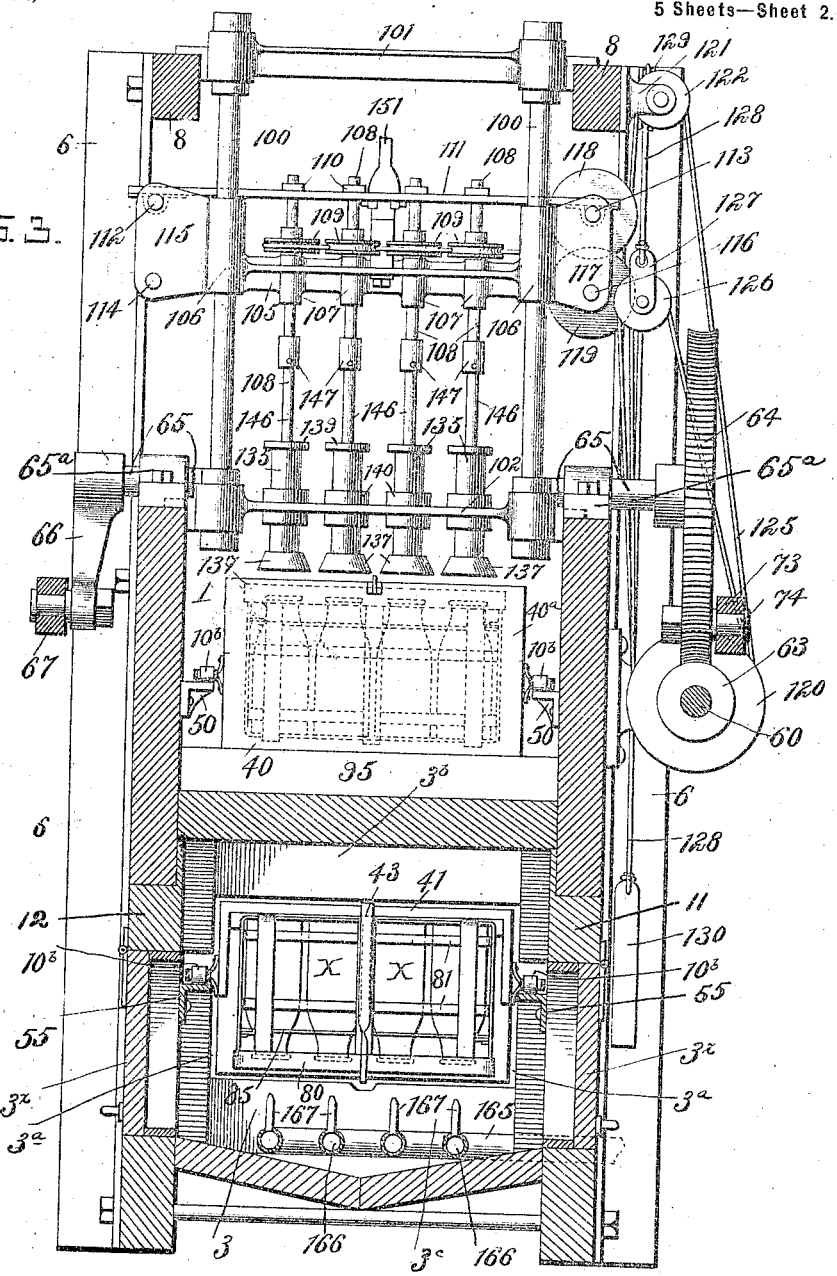

No. 688,740. Patented Dec. 10, 1901.
R. H. KISSEL & W. P. PARSONS.
BOTTLE WASHING AND STERILIZING MACHINE.
(Application filed Dec. 28, 1900.)
(No Model.) 5 Sheets—Sheet 3.

Witnesses.
Wm A. Courtland
Wm P. Hammond

Inventors.
Rudolph H. Kissel
Willard P. Parsons
By Knight Bros
Attys.

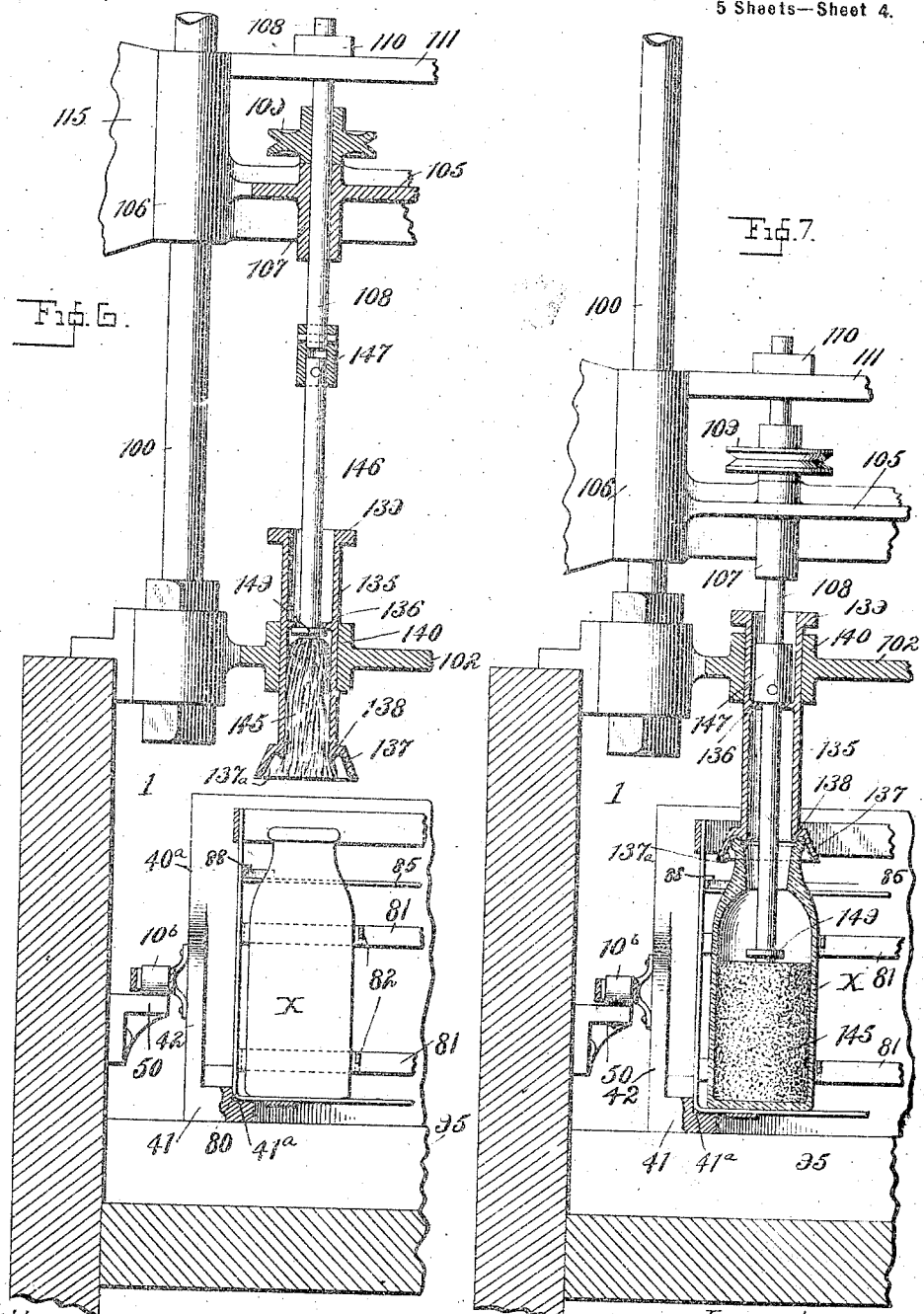

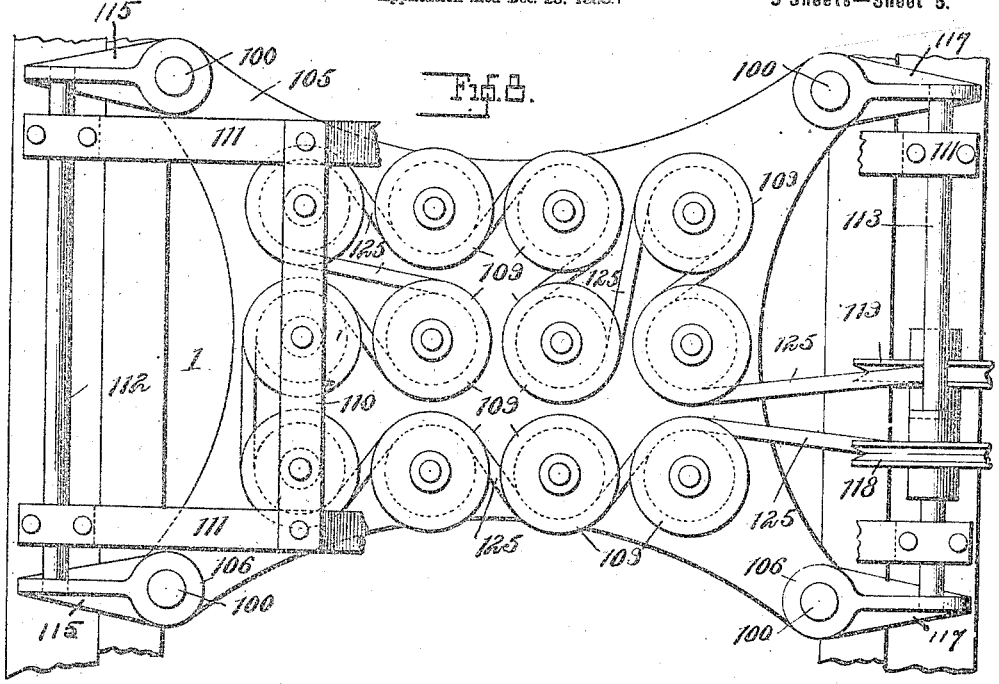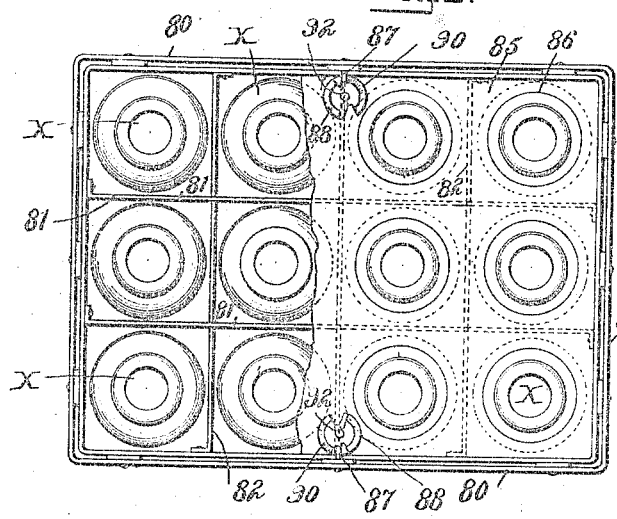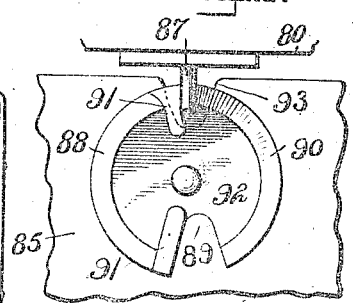

UNITED STATES PATENT OFFICE.

RUDOLPH H. KISSEL, OF MORRISTOWN, NEW JERSEY, AND WILLARD P. PARSONS, OF MATTEAWAN, NEW YORK, ASSIGNORS, BY DIRECT AND MESNE ASSIGNMENTS, TO THE CENTURY MILK COMPANY, OF JERSEY CITY, NEW JERSEY, AND NEW YORK, N. Y., A CORPORATION OF NEW JERSEY.

BOTTLE WASHING AND STERILIZING MACHINE.

SPECIFICATION forming part of Letters Patent No. 688,740, dated December 10, 1901.

Application filed December 28, 1900. Serial No. 41,385. (No model.)

*To all whom it may concern:*

Be it known that we, RUDOLPH H. KISSEL, residing at Morristown, county of Morris and State of New Jersey, and WILLARD P. PARSONS, residing at Matteawan, in the county of Dutchess and State of New York, citizens of the United States, have invented certain new and useful Improvements in Bottle Washing and Sterilizing Machines, of which the following specification, taken in connection with the accompanying drawings, is a full, clear, and exact description.

The purpose of our invention is to produce an automatically-operating machine which will thoroughly, rapidly, and economically wash and sterilize bottles in sets or crates; and to this end our invention comprises suitable bottle soaking, scrubbing, and emptying means, suitable bottle rinsing and emptying means, suitable steaming or sterilizing means, and suitable conveying mechanism adapted to carry the sets or crates of bottles to be washed through the soaking, scrubbing, rinsing, and steaming or sterilizing means to subject the bottles successively and automatically to the action of these several mechanisms.

More specifically, our invention comprises a bottle-washing tank or receptacle adapted to contain a washing medium, such as hot water, suitably-mounted bottle-scrubbing brushes arranged to operate upon the bottles within the washing tank or receptacle, and a rinsing tank or receptacle located at one end of the washing tank or receptacle, and also adapted to contain a washing medium, such as hot water, a steaming tunnel or chamber located beneath the washing tank or receptacle and the rinsing tank or receptacle, having means for projecting jets of steam upwardly into the washed and rinsed bottles, and an endless bottle carrier or conveyer adapted to carry successive sets or crates of bottles through the washing and rinsing tanks or receptacles and then through the steaming tunnel or chamber beneath the tanks to bring said sets or crates of bottles successively under the action of the washing, rinsing, and steaming devices. The endless bottle carrier or conveyer is operated by suitable intermittent feeding mechanism in order that the sets or crates of bottles will progress through the machine by steps and will be allowed to remain at rest at intervals while the bottles are undergoing the several cleansing operations referred to. The endless bottle carrier or conveyer is preferably in the form of two endless chains or belts supporting between them bottle-carrying chairs or frames for the sets or crates of bottles. Suitable sprocket-wheels or pulleys are arranged at the proper points in the machine to support the endless conveyer and cause it to travel through the washing, rinsing, and steaming compartments and carry the sets or crates of bottles into the washing and rinsing tanks or receptacles with the bottles in upright or approximately upright position, so as to cause them to immediately fill with the hot water or other washing medium, and out of the washing and rinsing tanks or receptacles in inverted or partially-inverted position to cause them to empty the washing or rinsing water or other medium back into the tank or receptacle which they have just left. The bottles are carried through the steaming tunnel or chamber in inverted position and are arrested at intervals directly above steam-jets, which inject steam into their open mouths. By reason of the arrangement of the successive bottle-carrying chairs or frames upon the endless conveyer and the timing of the conveyer-operating mechanism with relation thereto one set or crate of bottles will be in position to undergo each of the successive operations every time the endless conveyer comes to a rest. In other words, whenever the conveyer is at rest one or more sets or crates of bottles will be soaking in the washing tank or receptacle, one set will be in position to be operated upon by the scrubbing-brushes, another set will be in the act of emptying the wash-water back into the washing tank or receptacle, another set entering the rinsing-tank and filling with the rinsing-water or other medium, another set leaving the rinsing-tank and emptying the rinsing-water back into the tank, other sets on their way to the steaming tunnel or chamber, a number of sets in position above the steaming-jets within the steaming tunnel or chamber, and others in position to be removed by the operator to make place for succeeding sets or crates of bottles to be washed.

The bottle-scrubbing mechanism comprises, preferably, a series of rotating brushes mounted upon a vertically-movable frame which is lowered and raised intermittently to throw them into and out of operative relation with the successive sets of bottles in the washing tank or receptacle. The lowering and raising of the scrubbing-brushes is effected by suitable mechanisms, while the rotation of the brushes is effected by an independent mechanism arranged to allow the brushes to move vertically.

In addition to these main features of our invention there are many minor details of construction of more or less importance in the production of a practical machine according to our invention, and these features, together with the main devices above enumerated, will first be described with reference to the accompanying drawings and afterward pointed out with respect to their patentable novelty in the annexed claims.

Figure 5:
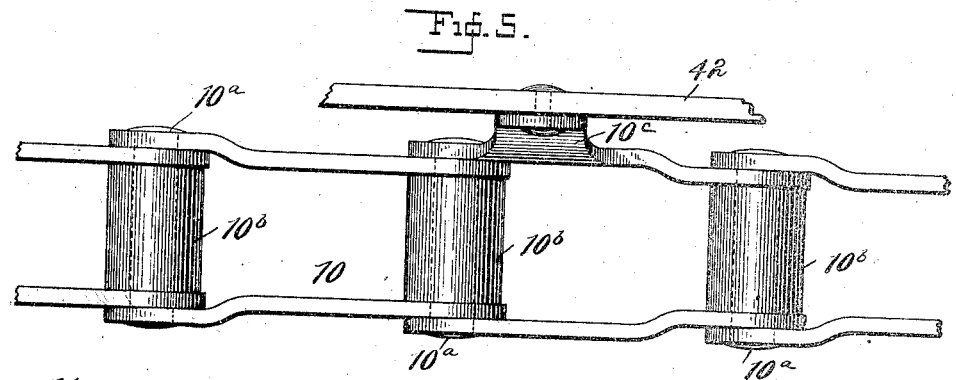

In said drawings, Figure 1 is a side elevation of a bottle washing and sterilizing machine embodying our invention. Fig. 2 is a plan view of the same, certain parts being omitted for the sake of clearness. Fig. 3 is a transverse vertical sectional view showing the scrubbing and sterilizing mechanisms, some of the parts being omitted. Fig. 4 is a detail longitudinal sectional elevation of part of the machine illustrating the step-by-step driving mechanism for the bottle-conveyer. Fig. 5 is a detail plan view of a section of one of the conveyer-chains. Fig. 6 is a detail sectional view illustrating one of the scrubbing-brushes in its relation to a bottle supported in the carrier, the brush being in inoperative position. Fig. 7 is a similar view illustrating the brush in operative position. Fig. 8 is a detail plan view of the brush-carrying frame, illustrating the driving mechanism for rotating the brushes. Fig. 9 is a detail plan view of one of the skeleton frames or baskets providing a crate for supporting a set of bottles, part of the bottle-retaining top frames or plates being broken away. Figs. 10 and 11 are respectively a detail plan and a detail elevation of one of the locking devices which secure the bottle-retaining frame or plate in the skeleton frame or basket.

1 is the washing tank or receptacle, 2 is the rinsing tank or receptacle, and 3 is the steaming or sterilizing tunnel or chamber. The tanks 1 and 2 are arranged end to end, with a dividing-wall 4 between them, while the steaming-chamber 3, which is open at both ends, is arranged directly under the tanks 1 and 2 and extends the whole length of the machine. These compartments are formed from any suitable material built up within the vertical standards 5 6 7, which extend above the top of the tanks 1 and 2 and support at their upper ends a framework 8, for the purpose which we will presently explain.

Suitable supply and waste pipes lead into and out of the tanks 1 and 2 for supplying any suitable bottle-washing medium, preferably hot water, and for leading off the dirty washing and rinsing water. These supply and waste pipes have not been shown. It may be found desirable to arrange for a supply of clean water to the rinsing-tank 2 and allow the rinsing-water to overflow therefrom into the washing-tank 1, from which the dirty wash-water may be led off as rapidly as necessary.

The endless bottle carrier or conveyer is formed of two endless sprocket-chains 10, which travel through the washing and rinsing tanks and the steaming-chamber around suitable supporting sprocket-wheels arranged in the manner which we will now describe.

11 and 12 are the main longitudinal frame-beams of the machine, extended at the ends beyond the steaming tunnel or chamber 3 and braced by suitable braces 13. Journaled upon the extensions of the beams 11 and 12 are the sprocket-wheel shafts 14 and 15, each of which carries a pair of sprocket-wheels 16 or 17. The pairs of sprocket-wheels 16 and 17 are arranged at opposite ends of the steaming tunnel or chamber 3, so as to guide and support the endless bottle-conveyer as it travels in a horizontal plane through said chamber. From the sprocket-wheels 16 the conveyer-chains 10 pass upwardly over a pair of sprocket-wheels 18, mounted upon shaft 19, journaled upon the vertical standards 5 of the machine-frame just above the washing-tank 1. The chains then pass downwardly into the washing-tank 1 under a pair of large sprocket-wheels 20, mounted upon a shaft 21, which is journaled upon the upper edges of the sides of the tank 1. The conveyer-chains then pass in a horizontal plane through the washing tank or receptacle 1 and up around a pair of large sprocket-wheels 23, mounted upon a shaft 24, journaled upon the upper edges of the sides of tank 1. From the large sprocket-wheels 23 the chains 10 pass around two pairs of small sprocket-wheels 25 and 26, mounted upon shafts 27 and 28, journaled to the top frame 8 of the machine, and from the sprocket-wheels 26 the chains pass downwardly into the rinsing-tank 2 around a pair of large sprocket-wheels 29, mounted upon the shaft 30, journaled upon the upper edges of the sides of tank 2. From the sprocket-wheels 29 the chains pass upwardly again and over a pair of small sprocket-wheels 31, mounted upon shaft 32, journaled to the top frame 8, and from there around a pair of sprocket-wheels 33, mounted upon a shaft 34, which is mounted in adjustable journal-boxes 35. The journal-boxes 35 work in vertical guideways of brackets 36 and are adjusted by means of hand-screws 37, threaded into the brackets 36 and engaging the adjustable journal-boxes 35. The chains 10 pass from sprocket-wheels 33 to the sprocket-wheels 17, above referred to, from which the chains run into and through the steaming tunnel or chamber 3 beneath the tanks. The adjustable sprocket-wheels 23 are for the purpose of tightening or loosening the conveyer-chains.

Mounted between the pair of conveyer-chains 10 are the bottle-carrying chairs or frames 40, each of which is constructed with a solid back plate 40ª, a skeleton bottom frame 41, side plates 42, and an angle locking-bar 43, journaled to the back plate at 44 and formed with a spring locking-finger at 45, which is adapted to engage the forward edge of the bottom frame 41. The angle-bar 43 embraces the top and front of the bottle-carrying chair or frame, and by it the crates or baskets filled with bottles to be washed, hereinafter described, are securely locked in the bottle-carrying chairs. The angle-bar 43 is formed of a metal strap, which is bent at 43ª so as to have a thin edge of the metal strap presented toward the top of the bottle-containing crate or basket and the flat face of the metal strap presented toward the front of the crate or basket. The purpose of this arrangement will be more fully understood from the description of the bottle crate or basket and the bottle-scrubbing brushes. The skeleton bottom frame 41 of the chair 40 is recessed at 41ª to form a seat for the bottle-carrying crate or basket 80.

The conveyer-chains 10 may be of any approved construction; but we prefer to employ the construction illustrated in Fig. 5 of the drawings, in which the several links are journaled together by means of tie-bolts 10ª, upon which are journaled the collars or rollers 10ᵇ, which serve the double function of spacing and holding the link-sections apart and affording antifriction-rollers for guiding the chain. At suitable intervals the inner link-sections of the conveyer-chains are formed with upwardly and downwardly projecting ears or lugs 10ᶜ, to which the side plates 42 of the bottle-carrying chairs or frames are securely riveted. These means connecting the chairs to the chains hold the chairs rigidly upon the links to which they are attached, so that the chairs will always follow the position of the attached links and will be presented in horizontal position when the links are horizontal and inverted or inclined position when the said links are inverted or inclined.

The bottle-carrying chairs 40, of which we prefer to employ a large number, as illustrated in the drawings, are hung by the described connecting means between the two conveyer-chains 10, and as the chains travel over the pairs of sprocket-wheels mounted upon their supporting-shafts, as above described, it will be observed that the bottle-carrying chairs will be allowed to pass freely between the supporting sprocket-wheels as the chains pass around the sprocket-wheels. By reason of the relative arrangement of the supporting sprocket-wheels it will be observed, particularly with reference to Fig. 1 of the drawings, that the bottle-carrying chairs or frames will be carried into the washing and rinsing tanks or receptacles 1 and 2 in upright or approximately upright position, so as to fill the bottles with the washing and rinsing water, and out of said tanks or receptacles in inverted or partially-inverted position, so as to empty the water out of the bottles into the tanks. It will also be observed that by reason of the reversal of the conveyer-chains in passing through the steaming tunnel or chamber 3 the bottle-carrying chairs or frames will be taken through said chamber in inverted position, by reason of which the bottles will be supported mouth down to the action of the steaming-jets.

To properly support the conveyer-chains 10 between sprocket-wheels 20 and 23, we prefer to arrange upon the inner faces of the sidewalls of the washing-tank 1 suitable guideways or tracks 50, which may conveniently be made of angle-bars, as shown in Figs. 3, 6, and 7 of the drawings. For supporting the conveyer-chains in the steam tunnel or chamber 3 between the sprocket-wheels 16 and 17 we arrange guideways or tracks 55 on the inner faces of the sides of the steam-chamber, as shown in Fig. 3. The antifriction-rollers 10ᵇ of the conveyer-chains 10 travel upon the guideways or tracks 50 and 55.

In order that the bottles carried by the conveyer may be given ample time for a thorough soaking, scrubbing, rinsing, and sterilizing, it is necessary that they pass through the machine with an intermittent or step-by-step motion. We will now describe one form of mechanism which may be employed for imparting this step-by-step feed motion to the conveyers.

60 is the main driving-shaft of the machine, journaled in bracket-bearings 61 and extending longitudinally of the machine. This shaft 60 may be driven in any suitable manner, as by a belt-pulley 62. Mounted upon the shaft 60 is a worm-gear 63, which meshes with and drives a worm-wheel 64, keyed to the driven shaft 65, journaled in suitable bearings 65ª upon the sides of the tank 1. Keyed to the opposite end of the shaft 65 is a crank-arm 66, which is connected through a pitman 67 and cross-bar 68 with a rock arm or lever 69, journaled upon a fixed shaft or bar 70, which is mounted in brackets 71, secured to the top frame 8 of the machine. 72 is another rock arm or lever, journaled upon the shaft or bar 70 and connected through the bar 68 and pitman 73 with a crank-pin 74, projecting from the face of the worm-wheel 64. These rock arms or levers 69 and 72 are freely journaled upon the shaft or bar 70, and each one carries at its lower end, within the washing tank or receptacle 1, a long feed dog or pawl 75, shod with a metal shoe 76, which is shaped to engage the antifriction-rollers 10ᵇ of the conveyer-chains 10. The feed dogs or pawls 75 are journaled at 75ª to the lower ends of the rock arms or levers 69 and 72. The bar 68 passes through and connects the rock arms or levers 69 and 72, so that under the action of the crank 66 and crank worm-wheel 64 said rock-arms 69 and 72 will be rocked forwardly and backwardly as a single structure, carrying the feed-dogs forward and back over the conveyer-chains to feed the conveyer forwardly with an intermittent or step-by-step movement. The feed-stroke of this mechanism is illustrated in the enlarged view, Fig. 4, in which figure the dotted lines represent the limit of the rearward motion and the beginning of the forward motion of the feed mechanism, while the full lines indicate the parts at the completion of their feed-stroke. In the rearward motion of the feed-dogs the shoes 76 ride upon the antifriction-rollers of the conveyer-chains; but in the forward or feeding motion it will of course be clear that the shoes 76 engage the antifriction-rollers and cause the chains to move forwardly for carrying the bottles through the machine. The feeding stroke is equal to the distance between the points of attachment of the chairs to the chains of two adjacent chairs.

An important feature of our machine is its rapidity of operation. In accomplishing this result we provide for washing, rinsing, and sterilizing of the bottles in sets, and we further arrange a large number of sets of bottles in close order upon the conveyer, so that the individual operations are not only performed on a large number of bottles at a time, but the successive sets of bottles are rapidly brought into position for the successive steps of the operation.

In the machine shown in the drawings the bottle carriers or chairs are arranged to carry crates or baskets containing sets of one dozen bottles each. The chairs may, however, be arranged to carry larger or smaller crates of bottles as the requirements of a particular business may dictate. These crates or baskets 80 are formed of strips of sheet metal securely bound together and braced for strength. The baskets are divided into compartments by longitudinal strips 81 and transverse strips 82, suitably secured in the basket and to each other. The bottles X fit loosely in the compartments formed in the crate or basket 80, and in order that the bottles will be held in the basket we provide a bottle-securing plate or top frame 85, which is formed with rows of openings 86, spaced and arranged to fit over and engage the necks of the bottles, as shown clearly in Fig. 9 of the drawings. The bottle-securing plate is of proper size to fit snugly within the crate or basket 80, and for the purpose of locking the securing-plate in place pins or lugs 87 project inwardly from the sides of the basket 80 in position to be engaged by the circular locking-plates 88, each of which is formed with a radial notch 89 to allow the locking-plate to pass freely beneath the locking-pin 87, a cam-face 90, adapted to engage the pin 87 when the locking-plate 88 is rotated, and radial wings or thumb and finger pieces 91, by which the locking-plate can be rotated. The locking-plates 88 are rotatably mounted upon the upper face of the securing-plate 85, adjacent to its long sides, by means of bolts or rivets 92, and cuts or notches 93 are formed in the edges of the securing-plate 85, as indicated in dotted lines in Fig. 10, to register with the notches 89 of the locking-plates 88 when the locking-plates are rotated in proper position. This is for the purpose of facilitating the insertion and removal of the securing-plate 85 in the top of the basket 80. By reason of the above-described construction of crate or basket 80 and the means for locking the bottles therein it will be observed that the bottles will be held in position whether the basket is presented in an upright or inverted position. These crates or baskets containing the bottles are placed in the chairs or frames 40 of the bottle-conveyer and secured therein by the locking angle-bar 43, above described, the narrow edge of the top portion of the angle-bar 43 engaging the upper face of the crate or basket 80 between two rows of bottles, so as not to interfere with the operation of the bottle-scrubbing brushes.

The crates or baskets of bottles are placed in the chairs of the conveyer at the left-hand end of the machine, as shown in Fig. 1, the intermittent driving mechanism allowing the conveyer to rest for a sufficient length of time after each forward impulse to enable the operator to remove a crate of washed and sterilized bottles and put in place another crate of soiled bottles ready to be washed. The crates of bottles pass first into the washing-tank, where they immediately fill with water, are soaked, and progress in three or four feeding impulses to a position directly beneath the bottle-scrubbing brushes, in which position the bottle-carrying chair will rest upon a block or base-piece 95, having an inclined end 96 to guide the chair thereon. The purpose of the block or base 95 is to firmly support the crate of bottles in the carrying-chair while the scrubbing-brushes are operating. While the bottles are progressing through the washing tank or receptacle 1 they are soaking in preparation for the action of the scrubbing-brushes. The construction and operation of the scrubbing-brushes will now be described.

Supported between the top frame-bars 8 and the sides of the washing tank or receptacle 1 are four vertical guide rods or bars 100, which are suitably braced at top and bottom by the frame-pieces 101 and 102. The bars 100 form the guide-frame upon which the vertically-movable frame or carriage 105 of the rotating brushes operates.

105 is a sliding frame or carriage formed with guide-sockets 106, which slide upon the guide-bars 100. This carriage 105 is formed with suitable strengthening-webs, as shown. In the vertical socket-bearings 107, which are formed in the carriage, are journaled the upper sections 108 of the shafts of the rotating bottle-scrubbing brushes 145. Keyed to the upper shaft-sections 108 are the small grooved pulleys 109, one for each shaft. The upper ends of the shaft-sections 108 (above pulleys 109) are journaled in the cross-bars 110, supported upon longitudinal bars 111, which are mounted at one end upon the rod or bar 112 and at the other end upon a rotary shaft 113. The bar 112 and a companion bracing-bar 114 are mounted in the wings or extensions 115 of the guide-sockets 106 at one side of the carriage 105, while the shaft 113 and a companion shaft 116 are journaled in wings or extensions 117 of the guide-sockets 106 at the opposite side of the carriage. The shaft 113 carries a guide-pulley 118, while the shaft 116 carries a similar guide-pulley 119, the pulleys 118 and 119 being arranged in parallel vertical planes.

Keyed to the main driving-shaft 60 of the machine is a double-grooved driving-pulley 120, while journaled in bracket-bearing 121, secured to a top frame-bar 8, is a small guide-pulley 122. The series of brushes are rotated by means of a continuous cord or belt 125, which passes from the driving-pulley 120 up over the guide-pulley 122, in under the guide-pulley 118 of the sliding carriage 105, around the small driving-pulleys 109 of the brush-shafts, as illustrated in Fig. 8, then out over the guide-pulley 119, down around the driving-pulley 120, up around the guide-pulley 126, and down around the driving-pulley 120 again to the point of starting, the driving belt or rope making two turns around the driving-pulley 120. The guide-pulley 126 is journaled in a floating yoke or bracket-bearing 127, secured to the end of a cord or rope 128, which passes over a guide-pulley 129, journaled on a top frame-bar 8 and has a weight 130 secured to its lower free end. The floating guide-pulley 126, controlled by the weight 130, is an automatic belt-tightener to keep the driving-belt 125 taut. By this means the scrubbing-brushes can be rotated continuously while they are in raised or lowered position and while they are moving from one position to the other.

135 represents brush-guiding sleeves or thimbles formed with interior flanges 136, conical bottle-engaging caps 137, having an interior annular flange 138 and an internal gasket or packing 137$^a$, and an upper limiting annular flange 139. The sleeves or thimbles 135 are mounted to move freely within the guide-sockets 140, formed in the frame-pieces 102. 145 is one of a series of brushes. The brush 145 is mounted on the lower end of the shaft-section 146, which is coupled to the upper shaft-section 108 by coupling 147, which allows slight lateral play in any direction between the shaft-sections 146 and 108 and affords greater freedom of the brush in entering the bottles. 149 is a collar secured to the shaft-section 146 just above the brush 145, which is adapted to engage the interior flange 136 of the sleeve or thimble 135 and elevate the thimble with the brush.

The vertically-sliding frame or carriage 105, upon which the rotary brushes are mounted, as just explained, is raised and lowered by the bar or lever 150, journaled upon bar 70 and connected with the frame or carriage 105 by means of a pitman 151, the lever 150 being engaged by a semicircular cam 152, keyed to a shaft 153, driven by a sprocket-wheel 154, a sprocket-chain 155, and a driving sprocket-wheel 156, keyed to the transverse shaft 65, above referred to.

It will be observed that when a crate of bottles reaches proper position on the supporting-base 95 the cam 152 will lower the carriage 105 and the twelve rotary brushes carried thereby into operative relation with the bottles in the crate. In Fig. 6 of the drawings we have shown the position of one of the brushes and attached parts when elevated, while in Fig. 7 we have shown the same brush and attached parts in lowered position while the brush is operating within the bottle. When the carriage and the brushes are lowered, the caps 137 of the sleeves 135 (the sleeves moving downwardly with the brushes) will first engage the mouths of the bottles and properly aline the bottles with the brushes, which are forced down into the former, the brushes being all the time rapidly rotated to effectively scrub all the interior surfaces of the bottles. The brushes and their surrounding guiding sleeves or thimbles are forced into engagement with the bottles by the weight of the sliding carriage and supported parts, the packings 137$^a$ snugly engaging the mouths of the bottles. The brushes are allowed to rotate within the bottles while the bottle-conveyer is at rest, the feed dogs or pawls 75 being on their return stroke while the brushes are operating. Immediately before the feed-dogs are ready to start the bottle-conveyers forward another step the cam 152 elevates the carriage and scrubbing-brushes, the brushes being pulled out of the bottles into their guiding sleeves or thimbles and the collars 149 of the brush-shafts engaging the interior flanges 136 of the thimbles and raising the thimbles away from the bottles and their crate or conveyer-chair. When this scrubbing operation has been completed upon a set of bottles, the conveyer carries the scrubbed set of bottles to the next position in the washing-tank and brings into position for scrubbing the succeeding set of bottles.

After a set of bottles has been scrubbed in the manner just explained it passes upwardly out of the washing-tank 1 and is inverted or partially inverted between the sprocket-wheels 23 and 25 to empty the wash-water from the bottles back into the washing-tank. The empty bottles then pass over into the rinsing-tank 2, where the bottles are filled with the clean rinsing-water, which is allowed to remain in them for a short time and is then emptied out of them into the rinsing-tank as the bottles pass over sprocket-wheels 29 to sprocket-wheels 31, the bottles being inverted or partially inverted as they leave the rinsing-tank. The washed and rinsed bottles are next carried into the open end of the steaming tunnel or chamber 3. As shown in Fig. 3 of the drawings, this steaming chamber or tunnel has an opening 3ª of just sufficient size to allow the entrance of the bottle-carrying chairs or frames. The chamber is larger in the interior than at its open ends, the ends being partially closed by cross-piece 3ᵇ at the top and piece 3ᶜ at the bottom. Arranged along the bottom of the steaming tunnel or chamber 3 are the steam-pipes 166, leading from a steam-pipe 165 and provided with vertical steam-jet pipes 167. These jet-pipes 167 are arranged in groups within the steaming-chamber, the groups being the same distance apart as the bottle-carrying chairs and the jet-pipes of each group being arranged to correspond with the positions of the bottles X in the basket or crate 80. The intermittent feed mechanism above described is timed to move the bottle-conveyer at each forward impulse a distance equal to the distance between the bottle-carrying chairs upon the bottle-conveyer. With this arrangement it will be clear that after the washed and rinsed bottles enter the steaming tunnel or chamber 3 they will be presented successively above the several groups of steam-jets, each set of bottles being brought to rest over each set of jet-pipes. By reason of the reversal of the conveyer-chains in passing into the steaming tunnel or chamber the bottles will be presented with their open mouths downwardly, so that the jets of steam will be effectively directed into the bottles, causing the bottles to be thoroughly sterilized by the steaming operation. The steam escaping from the bottles fills the entire space of the steaming tunnel or chamber, so that the bottles are not only filled with steam, but are surrounded with steam as they pass from the steaming-chamber. The steaming tunnel or chamber may be provided with suitable hinged doors 3ˣ to allow access to its interior.

After the bottles have been subjected to the sterilizing process, as just explained, they emerge from the opposite end of the steaming-chamber, and as they pass upwardly around the sprocket-wheels 16 the operator removes the crates of bottles from the chairs by swinging back the locking angle-bar 43 and immediately inserts in the chair another crate or basket of soiled bottles, which then passes over into the washing tank or receptacle 1 and undergoes the several steps of the cleansing process in the manner which has already been explained.

Our machine is not only of great value because of the effectiveness of the washing and sterilizing process, but also because of the economy in washing bottles, due mainly to the automatic operation of the machine, the crates of bottles being handled as a whole by the operator, who places them in and removes them from the machine, and also by the machine, which presents them successively to the several mechanisms. No intermediate handling of the bottles is necessary, and as the machine can dispose of a large number of bottles in a short time it will be clear that bottles can be effectively and economically washed.

The crates or baskets in which the bottles are washed are designed to be of sufficient strength and durability to enable them to withstand the rough treatment to which they are subjected, and it is our intention to retain the bottles in these crates not only during the washing and sterilizing process, but during the filling and capping processes. The use of such crates or baskets makes it possible to handle a large number of bottles at a time, thereby minimizing the expense of the several processes.

Having thus fully described our invention, the following is what we claim as new therein and desire to secure by Letters Patent:

1. A bottle washing and sterilizing machine comprising a washing-tank and a rinsing-tank located end to end, through which the bottles are conveyed in a forward direction, and a steaming-tunnel extending beneath the tanks, through which the bottles are conveyed in a rearward direction back to the starting-point where the bottles are removed.

2. A bottle washing and sterilizing machine comprising a washing-tank and a rinsing-tank located end to end, a steaming-tunnel extending beneath the tanks, and bottle-carrying means whereby the bottles are conveyed through the washing-tank, and through the rinsing-tank in a forward direction and through the steaming-tunnel, in inverted position and in a rearward direction back to the starting-point where the bottles are removed.

3. A bottle washing and sterilizing machine comprising a washing-tank and a rinsing-tank located end to end, a steaming-tunnel extending beneath the tanks, reciprocating and rotating scrubbing-brushes located on the washing-tank, bottle-carrying means whereby the bottles are conveyed through the washing-tank, and through the rinsing-tank in a forward direction and through the steaming-tunnel, in inverted position and in a rearward direction back to the starting-point where the bottles are removed and means whereby the scrubbing-brushes are rotated and reciprocated in the bottles resting thereunder within the washing-tank.

4. A bottle washing and sterilizing machine comprising a washing-tank and a rinsing-tank located end to end, a steaming-tunnel extending beneath the tanks, steam-jet pipes projecting upwardly in the steaming-tunnel, and bottle-carrying means whereby the bottles are conveyed through the washing-tank and through the rinsing-tank in a forward direction and in inverted position through the steaming-tunnel in a rearward direction back to the starting-point where the bottles are removed, over the steam-jet pipes.

5. A bottle washing and sterilizing machine comprising a washing-tank, and a rinsing-tank located end to end, a steaming-tunnel extending beneath the tanks, front, rear and intermediate standards within which the tanks and tunnel are built, a top frame connecting the upper ends of the standards and bottle-carrying means whereby the bottles are conveyed through the washing-tank, and through the rinsing-tank in a forward direction and through the steaming-tunnel in a rearward direction back to the starting-point where the bottles are removed.

6. A bottle washing and sterilizing machine comprising a washing-tank and a rinsing-tank located end to end, a steaming-tunnel extending beneath the tanks, front, rear, and intermediate standards within which the tanks and tunnel are built, a top frame connecting the upper ends of the standards, main longitudinal frame-beams extending beyond the steaming-tunnels, shafts carrying sprocket-wheels and journaled on the ends of the beams, a shaft carrying sprocket-wheels and journaled to the front standards, a shaft carrying sprocket-wheels and journaled on the sides of the washing-tank near the front end thereof, a shaft carrying sprocket-wheels and journaled on the sides of the washing-tank near the rear end thereof, shafts carrying sprocket-wheels and journaled to the top frame over the rear end of the washing-tank, a shaft carrying sprocket-wheels and journaled on the sides of the rinsing-tank, a shaft having sprocket-wheels and journaled on the sides of the rinsing-tank, a shaft having sprocket-wheels and journaled to the top frame over the rinsing-tank; an adjustable shaft carrying sprocket-wheels and journaled to the rear of the top frame, endless sprocket-chains extending around the sprocket-wheels, bottle-carrying chairs secured to the sprocket-chains, and means for operating the latter.

7. A bottle washing and sterilizing machine comprising a washing-tank and a rinsing-tank located end to end, a steaming-tunnel extending beneath the tanks, a framework within which the tanks and tunnel are built, endless sprocket-chains, sprocket-wheels having shafts and on which the sprocket-chains travel over, into and out of the tanks and through the steaming-tunnel, bottle-carrying chairs secured to the sprocket-chains, and means for tightening and loosening the sprocket-chains consisting of brackets having vertical guideways, adjustable journal-boxes carrying one of the shafts, and hand-screws threaded into the brackets and engaging the adjustable journal-boxes.

8. A bottle-carrying chair for a bottle washing and sterilizing machine constructed with a back plate, a skeleton bottom frame, side plates, and an angle locking-bar journaled to the back plate, and formed with a spring locking-finger adapted to engage the forward edge of the bottom frame.

9. The combination of bottle-carrying chairs, and conveyer sprocket-chains each constructed with plain outer links, inner links having upwardly and downwardly projecting ears secured rigidly to the side plates of the chairs, tie-bolts whereby the links are journaled together, and antifriction-rollers mounted upon the tie-bolts for spacing and holding the links apart.

10. A bottle washing and sterilizing machine comprising a washing-tank and a rinsing-tank located end to end, a steaming-tunnel extending beneath the tanks, endless sprocket-chains having supporting antifriction-rollers, guideways or tracks secured to the inner faces of the washing-tank and steaming-tunnel for supporting the sprocket-chains by their rollers, sprocket-wheels having shafts and on which the sprocket-chains travel over, and into and out of the tanks and through the steaming-tunnel, and bottle-carrying chairs secured to the sprocket-chains whereby the bottles are conveyed through the washing-tank, and through the rinsing-tank in a forward direction and through the steaming-tunnel in a rearward direction back to the starting-point where the bottles are removed.

11. A bottle washing and sterilizing machine comprising a washing-tank, and a rinsing-tank located end to end, a steaming-tunnel extending beneath the tanks, endless sprocket-chains having supporting antifriction-rollers, guideways or tracks secured to the inner faces of the washing-tank and steaming-tunnel for supporting the sprocket-chains by their rollers, sprocket-wheels having shafts and on which the sprocket-chains travel over and into, and out of the tanks and through the steaming-tunnel, bottle-carrying chairs secured to the sprocket-chains and means for imparting a step-by-step movement to the sprocket-chains.

12. A bottle washing and sterilizing machine comprising a washing-tank, and a rinsing-tank located end to end, a steaming-tunnel extending beneath the tanks, endless sprocket-chains having supporting antifriction-rollers, guideways or tracks secured to the inner faces of the washing-tank and steaming-tunnel for supporting the sprocket-chains by their rollers, sprocket-wheels having shafts and on which the sprocket-chains travel over, and into and out of the tanks and through the steaming-tunnel, bottle-carrying chairs secured to the sprocket-chains and means for imparting a step-by-step movement to the sprocket-chains consisting of a main driving-shaft having a worm-gear and journaled to the side of the machine, a driven shaft having a worm-wheel provided with a crank-pin and meshed by the worm-gear, a crank-arm fixed to the driven shaft, a fixed shaft carrying rock-arms, a cross-bar connecting the rock-arms, a pitman connecting the crank-arm with one end of the cross-bar, a pitman connecting the crank-pin on the worm-wheel with the other end of the cross-bar, and feed-dogs having shoes adapted to engage the anti-friction-rollers of the sprocket-chains.

13. The combination of a bottle-carrying chair for a bottle washing and sterilizing machine constructed with a back plate, a skeleton bottom frame having a recess, side plates, and an angle locking-bar journaled to the back plate, and formed with a spring locking-finger adapted to engage the forward edge of the bottom frame, and a crate formed of strips securely bound together and braced, and seating in the recess of the bottom plate, longitudinal and transverse strips providing compartments in the crate, and a removable top frame secured to the crate.

14. A bottle-crate for a bottle washing and sterilizing machine constructed of strips securely bound together and braced, longitudinal and transverse strips providing compartments in the crate, a top frame formed with openings arranged to fit over the mouths and engage the necks of the bottles, and with notches at opposite edges, pins projecting inwardly from the sides of the crate, and circular locking-plates formed with radial notches, cam-faces and finger-pieces and pivoted to the top frame.

15. A bottle-washing machine comprising a washing-tank, guide-rods surmounting the tank, lower and upper frame-pieces bracing the guide-rods over the tank, a vertically-moving carriage adapted to slide on the guide-rods, brush-guiding thimbles sliding loosely in the lower frame-pieces, the shafts journaled in the carriage having pulleys at their upper ends and scrubbing-brushes at their lower ends, the upper and lower bracing-bars at one end of the carriage, the upper end shafts having guide-pulleys at the other end of the carriage, a driving-shaft having a double pulley, guide-pulleys on the frame, a floating pulley, a cord extending from the double pulley over a guide-pulley on the frame under the upper guide-pulley of the carriage, around the pulleys of the brush-shafts, over the lower guide-pulley of the carriage, and around the double pulley, a cord extending from the floating pulley over the other guide-pulley on the frame and carrying a weight, and means for reciprocating the carriage.

16. A bottle-washing machine comprising a washing-tank, guide-rods surmounting the tank, lower and upper frame-pieces bracing the guide-rods over the tank, a vertically-moving carriage adapted to slide on the guide-rods, brush-guiding thimbles sliding loosely in the lower frame-piece, the shafts journaled in the carriage having pulleys at their upper ends and scrubbing-brushes at their lower ends, means for driving the pulleys, a cross-bar, a lever journaled on the cross-bar, at one end, a pitman connecting the carriage with the other end of the lever, a driving-shaft, a driven shaft, a worm-gear and worm-wheel connecting the driving and driven shafts, a cam-shaft having a cam adapted to operate the lever, and sprocket-wheels and chain connecting the driven and cam shafts.

17. A scrubbing-brush attachment for bottle-washing machines comprising guide-rods, upper and lower frame-pieces whereby the rods are braced, a carriage sliding on the guide-rods, the brush-shafts having upper sections provided with grooved pulleys and journaled in the carriage, lower sections, and couplings connecting the upper and lower sections together, the brush-guiding thimbles sliding loosely in the lower frame-piece and formed with upper interior flanges, and bottle-engaging caps having annular lower flanges, collars on the lower sections adapted to engage the upper flanges of the thimbles, means for driving the pulleys and means for reciprocating the carriage.

18. In a bottle-washing machine, the combination of a bottle-conveyer, a bottle-carrying basket adapted to be mounted upon the conveyer, a bottle-securing plate formed with a series of openings adapted to fit over the necks of the bottles in the basket, means for locking said securing-plate upon the basket and means for washing bottles, substantially as set forth.

19. In a bottle-washing machine, the combination of a bottle-conveyer, a bottle-carrying basket adapted to be mounted upon the conveyer, a bottle-securing plate formed with a series of openings adapted to fit over the necks of the bottles in the basket, pins or lugs projecting inwardly from upon the basket, rotatable locking-plates mounted upon the securing-plate and formed with cam-faces which are adapted to engage said pins or lugs and hold the securing-plate and bottles, in the basket, and means for washing bottles, substantially as set forth.

RUDOLPH H. KISSEL.
WILLARD P. PARSONS

Witnesses:
J. GREEN,
WM. E. KNIGHT.